United States Patent
Krasnov et al.

(10) Patent No.: US 6,806,639 B2
(45) Date of Patent: Oct. 19, 2004

(54) THIN FILM ELECTROLUMINESCENT DEVICE

(75) Inventors: Alexey N. Krasnov, Brampton (CA); Peter Hofstra, Guelph (CA); Richard P. Wood, Delhi (CA)

(73) Assignee: Luxell Technologies, Inc., Mississauga (CA)

( * ) Notice: Subject to any disclaimer, the term of this patent is extended or adjusted under 35 U.S.C. 154(b) by 0 days.

(21) Appl. No.: 10/207,189

(22) Filed: Jul. 30, 2002

(65) Prior Publication Data

US 2003/0189399 A1 Oct. 9, 2003

Related U.S. Application Data

(60) Provisional application No. 60/369,582, filed on Apr. 4, 2002.

(51) Int. Cl.$^7$ .................................................. H01J 1/62
(52) U.S. Cl. ........................ 313/503; 313/502; 313/503; 313/504; 428/690
(58) Field of Search ................................ 313/502–504, 313/498; 428/690

(56) References Cited

U.S. PATENT DOCUMENTS 6,153,123 A * 11/2000 Hampden-Smith et al. ..................... 252/301.4 S 6,242,858 B1 * 6/2001 Sun ............................. 313/503

FOREIGN PATENT DOCUMENTS

DE 4435016 A1 9/1994 ............. G09F/9/33

OTHER PUBLICATIONS

R. Boyn, et al., Ho centres in ZnS in the 3+ and 2+ state studied by optical and electron paramagnetic resonance spectroscopy, J. Phys, Matter 7 (1995), pp. 9061–9073.

* cited by examiner

Primary Examiner—Vip Patel
Assistant Examiner—Holly Harper
(74) Attorney, Agent, or Firm—Katten Muchin Zavis Rosenman

(57) ABSTRACT

An electroluminescent device having high-contrast and/or high-reliability is provided. The electroluminescent device comprises a pair of electrodes—at least one of which is transparent to electroluminescent light, and a phosphor layer which is disposed between the electrodes. The phosphor layer has a host crystal lattice, a first dopant and a second dopant. The first dopant cooperates with the host crystal lattice to cause light emission when a voltage is applied across the pair of electrodes, and the second dopant further distributes the first dopant in the host crystal lattice to increase light emission from the phosphor layer.

23 Claims, 3 Drawing Sheets

THIN FILM ELECTROLUMINESCENT DEVICE

PRIORITY CLAIM

The present application claims priority from U.S. Provisional Application No. 60/369,582, filed on Apr. 4, 2002, the contents of which are incorporated herein by reference.

FIELD OF THE INVENTION

This invention relates to electroluminescent devices, and more specifically relates to thin film electroluminescent devices having a doped phosphor layer.

BACKGROUND OF THE INVENTION

Thin film electroluminescent devices are well known, and are generally constructed from a series of thin films deposited onto a substrate. Typically, thin film electroluminescent devices consist of a transparent front electrode layer, a phosphor layer, and a back electrode layer. In an inorganic device, the phosphor layer is usually sandwiched between two dielectric layers. When an alternating voltage is applied across the electrodes, light is emitted from the phosphor layer. A detailed discussion of thin film electroluminescent devices can be found in, for example, U.S. Pat. No. 5,049,780, issued to DOBROWOLSKI et al., the contents of which are incorporated herein by reference. It is also known that the performance characteristics of the phosphor layer can be varied through doping of the phosphor material. Certain doped phosphor materials are discussed in Rack, P. D. and Holloway P. H., "The structure, device physics, and materials properties of thin film electroluminescent displays", *Materials Science and Engineering, R21, January* 1998, the contents of which are incorporated herein by reference.

Doped phosphor emitter materials are also taught in WIPO publication WO98/21919, published May 22, 1998 to VELTHAUS. According to VELTHAUS, the phosphor is made out of host crystal material from a compound of one or more earth-alkaline metals (or zinc or cadmium), in which these metals are present in the form of calcogenide, for example as sulphide. The host crystal is doped with traces of a rare earth, for example cerium or bismuth, and with additional traces of silver. VELTHAUS further teaches that a host lattice of $SrS:CeCl_3$ can be used to obtain blue/green light emission, and by adding Ag to the host lattice, a shift of emissions into the blue spectrum is achieved. As stated in VELTHAUS, this host lattice results in a highly crystalline phosphor layer. However, in certain applications, such high crystallinity is undesirable, as it can increase reflectivity, and/or decrease device life time. Further, VELTHAUS teaches phosphors that include a rare earth or bismuth, and therefore, is not well suited for use in ZnS:Mn based devices.

It will be apparent from the foregoing that prior art electroluminescent devices are generally designed with large-grain crystalline phosphor layers which can be undesirable in certain applications including certain high-contrast and/or high-reliability devices.

SUMMARY OF THE INVENTION

It is an object of the present invention to provide a novel thin film electroluminescent device which obviates or mitigates at least one of the above-described disadvantages of the prior art.

In a first aspect of the invention, there is provided an electroluminescent device comprising: a pair of electrodes of which at least one of the electrodes is transparent to electroluminescent light, and a phosphor layer disposed between the electrodes. The phosphor layer has a host crystal lattice, a first dopant and a second dopant where the first dopant cooperates with the host crystal lattice to cause light emission when a voltage is applied across the pair of electrodes, and the second dopant further distributes the first dopant in the host crystal lattice to increase light emission from the phosphor layer.

In one particular aspect of the first aspect of the invention, the electroluminescent device further comprises at least one dielectric layer disposed between the phosphor layer and at least one of the pair of electrodes. The dielectric layer is chosen from the group consisting of $Al_2O_3$, $Y_2O_3$, SiON, $SiO_2$, $Ta_2O_5$, and $BaTiO_3$.

In another particular aspect of the first aspect of the invention, the host crystal lattice is a wide band gap semiconductor. The wide band gap semiconductor is chosen from the group consisting of ZnS, ZnSe, ZnSSe, CaS, SrS, SrCaS and BaS.

In yet another aspect of the first aspect of the invention, the first dopant is chosen from the group consisting of Mn, Tb, Ho, Ce and Cu.

In a particular preferred aspect of the first aspect of the invention, the first dopant has a concentration of about 0.1% to about 2% by weight of the host crystal lattice. In a second preferred aspect, the first dopant has a concentration of about 0.2% to about 1% by weight of the host crystal lattice. It is particularly preferrred that the first dopant has a concentration of about 0.3% to about 0.8% by weight of the host crystal lattice. Typically, the first dopant has a preferred concentration of about 0.6% by weight of the host crystal lattice.

In keeping with another aspect of the first aspect of the invention, the second dopant is a Group IB metal. As is known to those of skill in the art, the Group IB metal includes Cu, Ag and Au. Preferably, the second dopant is Ag. In a particular aspect of the first aspect of the invention, the second dopant has a concentration of about 0.25% to about 2% of the first dopant concentration. More particularly, the second dopant has a concentration of about 0.5% to about 1.5% of the first dopant concentration. More particularly, the second dopant has a concentration of about 0.6% to about 1.2% of the first dopant concentration. Typically, the second dopant has a concentration of about 1% of the first dopant concentration.

In an alternative aspect, there is provided a phosphor material comprising: a host crystal lattice, an emitter material doped with the host crystal lattice, and a displacer material doped concurrently with the emitter material to the host crystal lattice for urging the emitter material into substitutional positions within the host crystal lattice.

In another alternative aspect, there is provided a phosphor material comprising: a host crystal lattice, an emitter material doped with the host crystal lattice, and a displacer material doped concurrently with the emitter material to the host crystal lattice for urging the emitter material into light emissive positions within the host crystal lattice such that energy interactions between the emitter material during excitation are reduced and light emissions therefrom are increased.

In yet another aspect of the invention, there is provided an electroluminescent device comprising: a pair of electrodes of which at least one of the electrodes is transparent to electroluminescent light; a phosphor layer disposed between the electrodes; at least one dielectric layer disposed between the phosphor layer and at least one of the pair of electrodes; and a substrate layer above which one of the pair of electrodes, the at least one dielectric layer, the phosphor layer, and the one other of the pair of electrodes are successively deposited. The phosphor layer has a host crystal lattice, a first dopant and a second dopant where the first dopant cooperates with the host crystal lattice to cause light emission when a voltage is applied across the pair of electrodes, and the second dopant further distributes the first dopant in the host crystal lattice to increase light emission from the phosphor layer. Typically, the dielectric layer is $Al_2O_3$, the host crystal lattice is ZnS, the first dopant is Mn, and the second dopant is Ag. It is presently preferred that the first dopant has a concentration of about 0.6% by weight of the host crystal lattice, and that the second dopant has a concentration of about 1% of a first dopant concentration.

In a second aspect of the invention, there is provided a method of assembling at least a portion of an electroluminescent device. The method comprises the steps of: depositing a first electrode above a substrate, forming a phosphor layer above the first electrode, in which the phosphor layer is formed by depositing a host crystal lattice, a light emitting dopant and a dispersing dopant substantially simultaneously above the first electrode such that the dispersing dopant urges at least a portion of the light emitting dopant into positions within the host crystal lattice that are favourable to light emission, and the step of depositing a second electrode above the phosphor layer.

In one particular aspect of the invention, the electroluminescent device further comprises at least one dielectric layer disposed between the phosphor layer and at least one of the pair of electrodes. Thus, the method of assembling such an electroluminescent device further comprises the step of depositing the at least one dielectric layer onto the at least one of the pair of electrodes and/or phosphor layer.

In one aspect of the invention, deposition of the host crystal lattice is controlled using a standard quartz crystal monitor. In another aspect of the invention, deposition of the first dopant and second dopant is controlled using Knudsen cells. In yet another aspect of the invention, deposition of the first dopant and second dopant is controlled using a chopper wheel. In an alternative aspect of the invention, formation of the phosphor layer is chosen from the group of deposition methods consisting of sputter, ebeam deposition, and atomic layer epitazy.

The host crystal lattice is typically ZnS, and the first dopant is Mn or the first dopant is Ho. Typically, the second dopant is Ag.

In a particular preferred aspect of the second aspect of the invention, the deposition temperature of the first dopant is from about 600° C. to about 1200° C. In another preferred aspect, the deposition temperature of the first dopant is from about 650° C. to about 925° C. Typically, the deposition temperature of Mn is about 915° C. Furthermore, the deposition of Ho is typically from about 700° C. to about 850° C. In yet another preferred aspect, the deposition temperature of the second dopant is from about 600° C. to about 1200° C. It is preferred that the deposition temperature of the second dopant is from about 700° C. to about 1100° C. Typically, the deposition temperature of Ag is from about 700° C. to about 730° C.

In a third aspect of the invention, there is provided a method of assembling at least a portion of an electroluminescent device, comprising the steps of: depositing a first electrode above a substrate, depositing at least one dielectric layer onto the first electrode, forming a phosphor layer above the first electrode in which the phosphor layer is formed by depositing a host crystal lattice, a light emitting dopant at a temperature of about 650° C. to about 925° C., and a dispersing dopant at a temperature of about 600° C. to about 1200° C. substantially simultaneously above the first electrode such that the dispersing dopant urges at least a portion of the light emitting dopant into positions within the host crystal lattice that are favourable to light emission, and depositing a second electrode above the phosphor layer.

BRIEF DESCRIPTION OF THE DRAWINGS

The present invention will now be described, by way of example only, with reference to certain embodiments shown in the attached Figures in which.

DETAILED DESCRIPTION OF THE PREFERRED EMBODIMENTS

Figure 1:
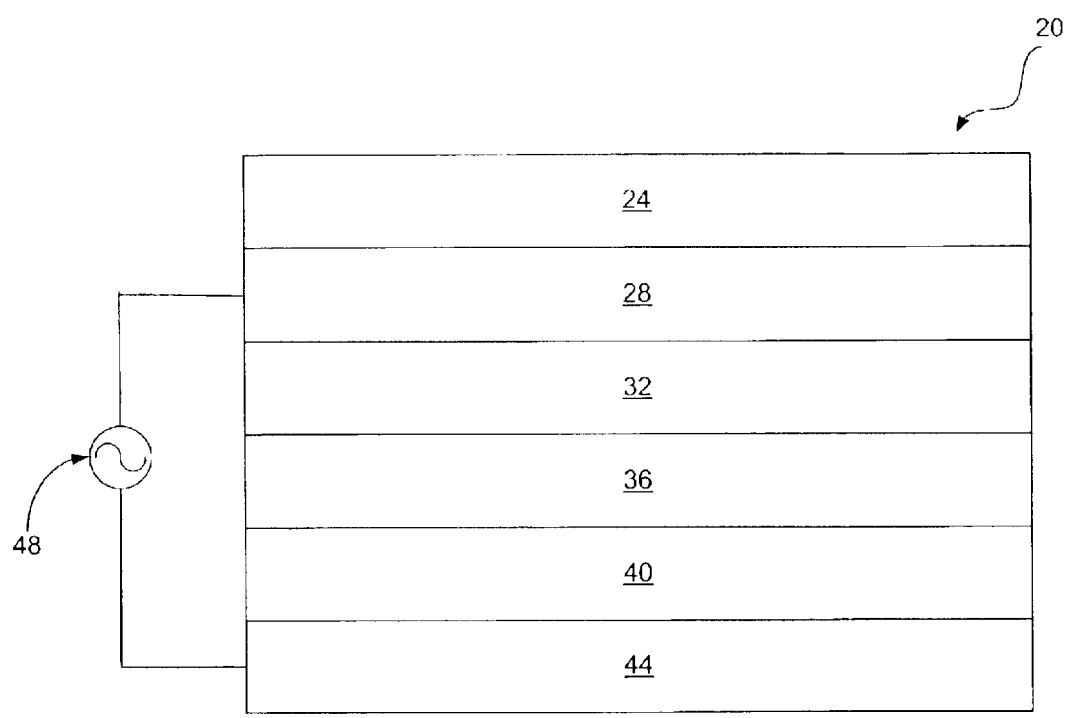
FIG. 1 is a schematic diagram of a cross-section of a electroluminescent device in accordance with an aspect of the present invention.

Referring first to FIG. 1, an electroluminescent device in accordance with an embodiment of the invention is indicated generally at 20. Electroluminescent device 20 comprises a substrate 24 onto which a transparent electrode 28, a first dielectric layer 32, a phosphor layer 36, a second dielectric layer 40, and a counter electrode 44 are successively deposited. When an alternating voltage from a voltage source 48 is applied across the pair of electrodes 28 and 44, light is emitted from phosphor layer 36 through transparent electrode 28. Substrate 24 is most commonly glass, however, any suitable substrate can be used. Typically, first and second dieletric layers 32 and 40 are chosen from the group of materials consisting of $Al_2O_3$, $Y_2O_3$, SiON, $SiO_2$, $Ta_2O_5$, $BaTiO_3$. In a presently preferred embodiment, $Al_2O_3$ is used for layers 32 and 40.

Phosphor layer 36 is composed of a wide band gap semiconductor material that is doped with a first dopant and a second dopant. In a presently preferred embodiment, ZnS is the wide band gap semiconductor material, Mn is the first dopant, and Ag is the second dopant. It is believed that a suitable concentration range of Mn is from about 0.1% to about 2% by weight of ZnS. Preferably, the concentration range of Mn is from about 0.2% to about 1% by weight of ZnS. More preferably, the concentration range of Mn is from about 0.3% to about 0.8% by weight of ZnS. In a presently preferred embodiment, the concentration of Mn is about 0.6% by weight of ZnS. It is believed that a suitable concentration range of Ag is from about 0.25% to about 2% of the Mn concentration. Preferably, the concentration of Ag is from about 0.5% to about 1.5% of the Mn concentration. More preferably, the concentration of Ag is in the range of about 0.6% to about 1.2% of the Mn concentration. In a presently preferred embodiment, the concentration of Ag is 1% of the Mn concentration. It should now be apparent to those skilled in the art that different ranges for each dopant can be chosen according to the desired electrical and light emitting characteristics of the device 20.

A method of assembling a thin film electroluminescent device in accordance with another embodiment of the invention will now be discussed. In order to assist in the explanation of the method, reference will be made to FIG. 1 and the foregoing discussion of device 20. First, transparent electrode 28 and dielectric 32 are deposited onto substrate 24 in the usual manner. Next, during the deposition of phosphor layer 36, ZnS, Mn and Ag are simultaneously deposited using separate sources. The ZnS deposition is controlled using a standard quartz crystal monitor. The Mn and Ag materials are deposited using a Knudsen cell, in which a crucible filled with the relevant material is wrapped in heating coils through which current is passed.

The rate of deposition is determined by setting the monitored temperature of the cell and thereby selecting the vapour pressure of each respective material. The deposition temperature of Mn can be from about 860° C. to about 925° C., while the deposition temperature of Ag can be from about 710° C. to about 790° C. In a presently preferred embodiment, the Mn is deposited at about 915° C., and Ag is simultaneously deposited at about 730° C. The rate of deposition of Mn is about 500 times than the rate of deposition of Ag.

The above-described method can be modifed for use with the ZnS:Ho system, by doping Ag therewith. Presently preferred deposition temperature for Ag is about 1000° C., and for Ho, the presently preferred deposition temperature is about 700° C. to about 850° C., in order to effect the desired rates of deposition.

Figure 2:
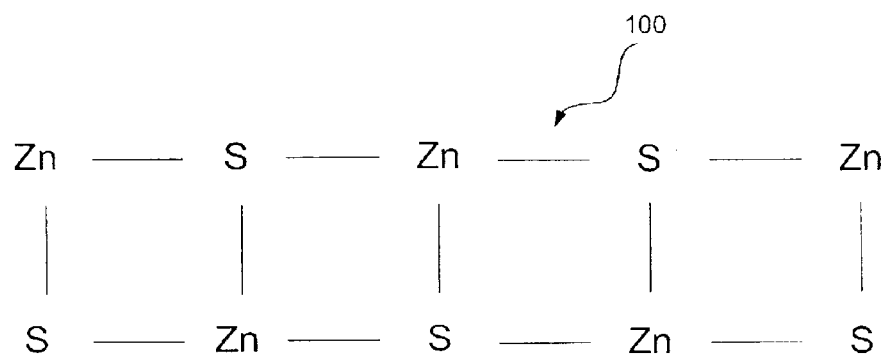
FIG. 2 is a prior art two-dimensional crystal structure illustrating a host crystal lattice.

Before discussing the next embodiment of the invention, certain prior art crystal lattices and prior art phosphor materials for use in displays will now be discussed. Referring now to FIG. 2, a host crystal lattice suitable for use in forming a phosphor material is indicated generally at 100. As shown in FIG. 2, host crystal lattice 100 is the wide band gap semiconductor ZnS.

Figure 3:
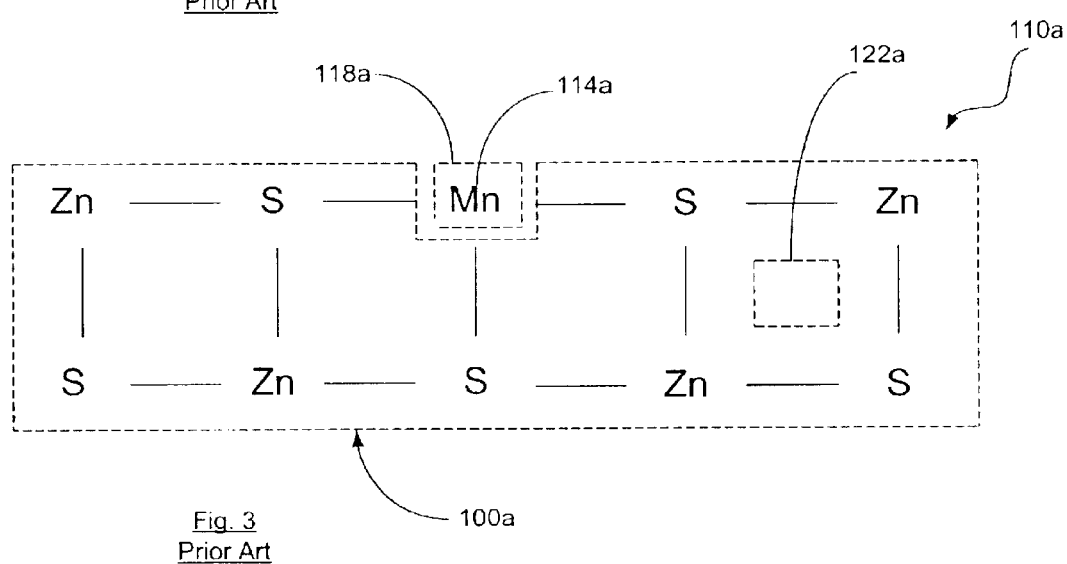
FIG. 3 is a prior art two-dimensional crystal structure illustrating a host crystal lattice doped with a first dopant.

Referring now to FIG. 3, a prior art phosphor material is shown as a two-dimensional representation of a doped crystal lattice indicated generally at 110a. Prior art doped crystal lattice 110a is defined by a host crystal lattice 100a and an emitter material dopant 114a. Host crystal lattice 100a is characterized by at least one substitutional position 118a and at least one interstital position 122a. As shown in FIG. 3, host crystal lattice 100a is the wide band gap semi-conductor ZnS (i.e. substantially the same as host crystal lattice 100 shown in FIG. 2) and emitter material dopant 114a is Mn. Those of skill in the art will recognize that emitter material dopant 114a is occupying a substitutional position 118a within host crystal lattice 100a, but that interstitial position 122a is unoccupied. Those of skill in the art will now further recognize that, when the prior art phosphor material shown in FIG. 3 is disposed between the appropriate electrodes and a voltage is applied thereto, current passing through prior art doped crystal lattice 110a will cause light to be emitted from emitter material dopant 114a.

Figure 4:
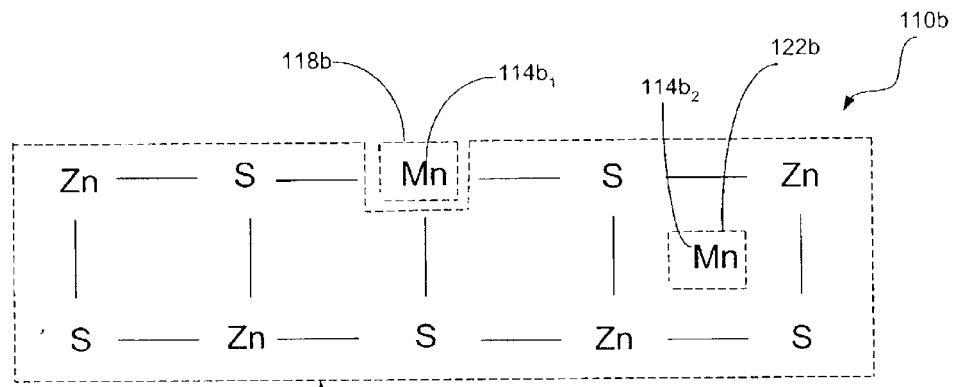
FIG. 4 is a prior art two-dimensional crystal structure illustrating a host crystal lattice doped with a first dopant.

Another prior art phosphor material is shown in FIG. 4 as a two-dimensional representation of a doped crystal lattice which is indicated generally at 110b. Prior art doped crystal lattice 110b is defined by a host crystal lattice 100b and an emitter material dopant 114b, (identified twice in FIG. 4, with reference characters $114b_1$ and $114b_2$, but collectively referred to herein as 114b). Host crystal lattice 100b is characterized by at least one substitional position 118b and at least one interstital position 122b. As shown in FIG. 4, host crystal lattice 100b is the wide band gap semiconductor ZnS (i.e. substantially the same as host crystal lattice 100a shown in FIG. 3) and emitter material dopant 114b is Mn (i.e. substantially the same as emitter material dopant 114a in FIG. 3). Those of skill in the art will recognize that emitter material dopant $114b_1$ is occupying a substitutional postion 118b within host crystal lattice 110b. In addition, those of skill in the art will recognize that emitter material dopant $114b_2$ occupies interstitial position 122b. Those of skill in the art will now recognize that, when the prior art phosphor material shown in FIG. 4 is disposed between the appropriate electrodes and a voltage is applied thereto, current passing through prior art doped crystal lattice 110b will cause a certain amount of light to be emitted from the emitter material dopant $114b_1$. However, the overall amount of light emitted from prior art host crystal lattice 110b will be somewhat less than the amount of light emitted from prior art host crystal lattice 110a, because interactions between emitter material dopants $114b_1$ and $114b_2$ will result in a certain amount of energy being simply non-radiatively transferred from the luminescent centre of emitter material dopant $114b_1$ to the luminescent centre of emitter material dopants $114b_2$, rather than being simply emitted as light from emitter material dopant $114b_1$.

Figure 5:
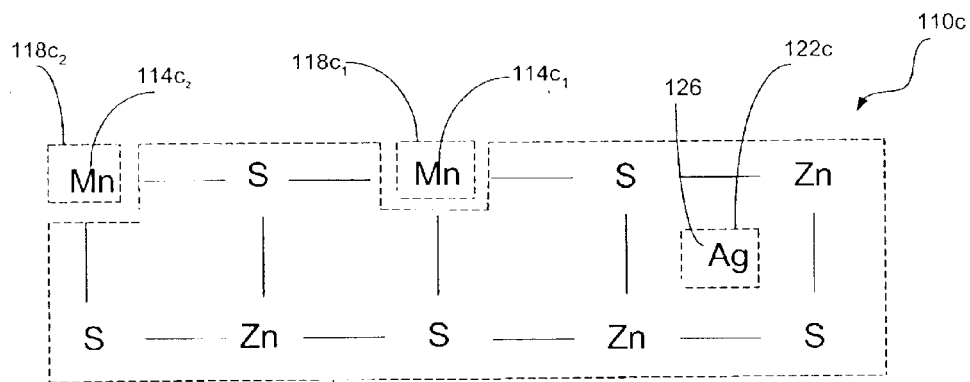
FIG. 5 is a two-dimensional crystal structure illustrating a host crystal lattice doped with a first dopant and a second dopant in accordance with an aspect of the present invention.

Having described various prior art crystal lattices and prior art phosphor materials derived therefrom, a phosphor material in accordance with another embodiment of the invention will now be discussed with reference to FIG. 5. Accordingly, a phosphor material for use in a display that is in accordance with another embodiment of the invention is shown in FIG. 5 as a two-dimensional representation of a doped crystal lattice that is indicated generally at 110c. Doped crystal lattice 110c is defined by a host crystal lattice 100c and an emitter material dopant 114c and a displacement material dopant 126. Emitter material dopant 114c is identified twice in FIG. 5, with reference characters $114c_1$ and $114c_2$, but is collectively referred to herein as 114c. Host crystal lattice 100c is characterized by two substitutional positions 118c (identified twice in FIG. 5, with reference characters $118c_1$ and $118c_2$, but collectively referred to herein as 118c) and at least one interstitial position 122c. As shown in FIG. 5, host crystal lattice 100c is the wide band gap semi-conductor ZnS (i.e. substantially the same as host crystal lattice 100a shown in FIG. 3) and emitter material dopant 114c is Mn (i.e. substantially the same as emitter material dopant 114a in FIG. 3). Emitter material dopant $114c_1$ occupies substitutional position $118c_1$, and emitter material dopant $114c_2$ occupies substitutional position $118c_2$ of host crystal lattice 100c.

In addition, displacement material dopant 126 occupies interstitial position 122c. In a presently preferred embodiment, displacement material dopant 126 is Ag.

Formation of doped crystal lattice 100c can be accomplished using any desired means, (such as, for example, the above-described method in paragraph 0025) wherein the displacement material dopant 126 and emitter material dopant 114 are simultaneously deposited with the wide band gap semi-conductor that forms the basis for host crystal lattice 100c. During such deposition, displacement material dopant 126 interacts with emitter material dopant 114c and the wide band gap semi-conductor, such that displacement material dopant 126 urges emitter material dopant 114c into positions in crystal lattice 110c that are favourable to light emission, which in the present embodiment are the substitutional positions 118c of lattice 110c.

During operation, when the phosphor material represented in FIG. 5 is disposed between the appropriate electrodes and a voltage applied thereto, current passing through doped crystal lattice 110c will cause light to be emitted from both the emitter material dopants $114c_1$ and $114c_2$.

While the foregoing embodiment discussed with FIG. 5 refers to ZnS as a specific wide band gap semi-conductor (and its associated host crystal lattice 100c), Mn as a specific emitter dopant 114c, and Ag as a specific displacement dopant 126, it is to be understood that other materials can be used in other embodiments of the invention. For example, it is contemplated that Ho can be used as the emitter dopant, being co-doped with the displacement dopant Ag within the host crystal lattice ZnS. Other wide band gap semi-conductors, emitter materials and displacement dopants will occur to those of skill in the art. For example, wide band gap semi-conductors may be chosen from the group consisting of ZnSe, ZnSSe, CaS, SrS, SrCaS and BaS.

While only specific combinations of the various features and components of the present invention have been discussed herein, it will be apparent to those of skill in the art that desired sub-sets of the disclosed features and components and/or alternative combinations and variations of these features and components can be utilized, as desired. For example, although a first dielectric layer 32 and a second dielectric layer 40 are shown in FIG. 1 as part of the presently preferred embodiment, it is also possible to omit either or both of layers 32 and 40, or add additional layers as deemed desirable.

Furthermore, other methods of forming device 20, and variations thereof, are also within the scope of the invention. For example, another method for controlling the deposition of the dopants is to use a chopper wheel, as commonly used in the semiconducting industry, wherein a round wheel is rotated in front of the deposition source. The deposition source is operated at a known and measurable rate (e.g. 2–3 Å/sec.) and maintained using a standard quartz crystal monitor. The chopper wheel has a section removed from it such that when the wheel is spun in front of the crystal monitor, the deposition of the source material is reduced to the desired rate. For example if a rate of 3 Å/sec is being monitored before the chopper wheel but a rate of 0.03 Å/sec is desired at the substrate, an area of $1/100^{th}$ of the chopper wheel would be removed. In this way most deposition is blocked, except for $1/100^{th}$. The speed of the chopper wheel can thus affect the distribution of the dopant and is thus preferably rotated at a rate fast enough to equalize distribution, but at just the appropriate speed to achieve the desired deposition rate. Chopper wheels could thus be used with both Ag and Mn, as a means of controlling the deposition rates of each. Other methods of assembling will be apparent to those of skills in the art, such as sputter, ebeam deposition, and atomic layer epitazy.

The present invention provides a novel electroluminescent device having a phosphor layer comprised of a wide band gap semiconductor, doped with a first dopant and a second dopant. Where the wide band gap semiconductor is ZnS and the first dopant is Mn, the addition of Ag as the second dopant can, in certain circumstances, increase the brightness of the display over a display that does not include the second dopant. Additionally, it is believed that where ZnS:Mn (where ZnS:Mn is a notation representing that ZnS is a wide-band gap semiconductor that has been doped with Mn) is used, the doping with Ag can increase the internal efficiency, over certain prior art displays that simply use ZnS:Mn, by a factor of up to about three and overall luminance by a factor of up to about 2.5.

Additionally, where the wide band gap semiconductor is ZnS and the first dopant is Ho, the addition of Ag as the second dopant can, in certain circumstances, assist in overcoming the solid solubility limit of Ho in ZnS that otherwise impairs the brightness of simple ZnS:Ho as a phosphor. Thus, the addition of Ag to ZnS:Ho can result in increased efficiency and brightness over a simple ZnS:Ho phosphor. Also, it is believed that the introduction of Ag promotes a short-wavelength shift of the ZnS:Ho emission due to enhanced blue component of the electroluminescence spectrum.

What is claimed is:

1. An electroluminescent device comprising:
    a pair of electrodes, at least one of said electrodes being transparent to electroluminescent light;
    a phosphor layer disposed between said electrodes, said phosphor layer having:
        a host crystal lattice;
        a first dopant having a concentration in said host crystal lattice and cooperating with said host crystal lattice to cause light emission when a voltage is applied across said pair of electrodes; and
        a second dopant having a concentration in said host crystal of from about 0.25% to about 2% by weight of said concentration of said first dopant in said host crystal,
    said second dopant further distributing said first dopant to positions in said host crystal lattice to increase light emission from said phosphor layer.

2. The electroluminescent device according to claim 1, further comprising at least one dielectric layer disposed between said phosphor layer and at least one of said pair of electrodes.

3. The electroluminescent device according to claim 2, wherein said dielectric layer is chosen from the group consisting of $Al_2O_3$, $Y_2O_3$, SiON, $SiO_2$, $Ta_2O_5$, $BaTiO_3$.

4. The electroluminescent device according to claim 1, wherein said host crystal lattice comprises a wide band gap semiconductor.

5. The electroluminescent device according to claim 4, wherein said wide band gap semiconductor is chosen from the group consisting of ZnS, ZnSe, ZnSSe, CaS, SrS, SrCaS and BaS.

6. The electroluminescent device according to claim 1, wherein said first dopant is chosen from the group consisting of Mn, Tb, Ho, Ce and Cu.

7. The electroluminescent device according to claim 1, wherein said first dopant has a concentration of about 0.1% to about 2% by weight of said host crystal lattice.

8. The electroluminescent device according to claim 1, wherein said first dopant has a concentration of about 0.2% to about 1% by weight of said host crystal lattice.

9. The electroluminescent device according to claim 1, wherein said first dopant has a concentration of about 0.3% to about 0.8% by weight of said host crystal lattice.

10. The electroluminescent device according to claim 1, wherein said first dopant has a concentration of about 0.6% by weight of said host crystal lattice.

11. The electroluminescent device according to claim 1, wherein said second dopant comprises Ag.

12. The electroluminescent device according to claim 7, wherein said second dopant has a concentration of about 0.5% to about 1.5% by weight of said first dopant concentration.

13. The electroluminescent device according to claim 7, wherein said second dopant has a concentration of about 0.6% to about 1.2% by weight of said first dopant concentration.

14. The electroluminescent device according to claim 7, wherein said second dopant has a concentration of about 1% by weight of said first dopant concentration.

15. A phosphor material comprising:

a host crystal lattice;

an emitter material doped with said host crystal lattice; and a displacer material doped concurrently with said emitter material to said host crystal lattice for urging said emitter material into substitutional positions within said host crystal lattice, said displacer material being doped at concentrations of from about 0.25% to about 2% by weight of the concentration of the emitter material.

16. A phosphor material comprising:

a host crystal lattice;

an emitter material doped with said host crystal lattice; and, a displacer material doped, at concentrations of from about 0.25% to about 2% by weight of the concentration of the emitter material, concurrently with said emitter material to said host crystal lattice for urging said emitter material into light emissive positions within said host crystal lattice such that non-light emitting energy interactions between said emitter material during excitation are reduced and light emissions therefrom are increased.

17. An electroluminescent device comprising:

a pair of electrodes, at least one of said electrodes being transparent to electroluminescent light;

a phosphor layer disposed between said electrodes, said phosphor layer having a ZnS host crystal lattice, a Mn first dopant with a concentration of about 0.1% to about 2% by weight of said host crystal lattice, and a Ag second dopant with a concentration of about 0.25% to about 2% by weight of a first dopant concentration, said first dopant cooperating with said host crystal lattice to cause light emission when a voltage is applied across said pair of electrodes, and said second dopant for further distributing said first dopant to positions in said host crystal lattice to increase light emission from said phosphor layer;

at least one $Al_2O_3$ dielectric layer disposed between said phosphor layer and at least one of said pair of electrodes; and a substrate layer onto which one of said pair of electrodes, said at least one dielectric layer, said phosphor layer, and said one other of said pair of electrodes are successively deposited.

18. The electroluminescent device according to claim 17, wherein said first dopant has a concentration of about 0.2% to about 1% by weight of said host crystal lattice.

19. The electroluminescent device according to claim 17, wherein said first dopant has a concentration of about 0.3% to about 0.8% by weight of said host crystal lattice.

20. The electroluminescent device according to claim 17, wherein said first dopant has a concentration of about 0.6% by weight of said host crystal lattice.

21. The electroluminescent device according to claim 17, wherein said second dopant has a concentration of about 0.5% to about 1.5% by weight of said first dopant concentration.

22. The electroluminescent device according to claim 17, wherein said second dopant has a concentration of about 0.6% to about 1.2% by weight of said first dopant concentration.

23. The electroluminescent device according to claim 17, wherein said second dopant has a concentration of about 1% by weight of said first dopant concentration.

* * * * *